W. MORRISON.
Plow.
No. 7,656.
Patented Sept. 17. 1850.
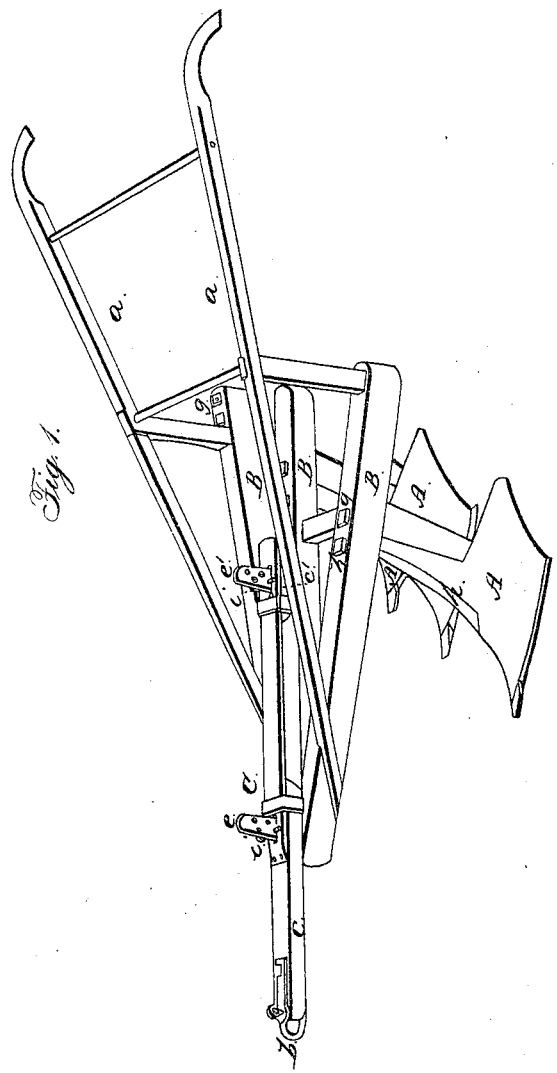
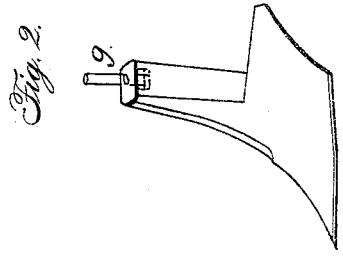
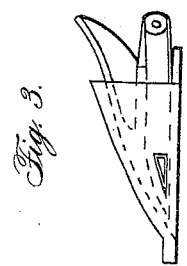

UNITED STATES PATENT OFFICE.

WM. MORRISON, OF CARLISLE, PENNSYLVANIA.

IMPROVEMENT IN SPRING-BEAMS TO PLOWS.

Specification forming part of Letters Patent No. 7,656, dated September 17, 1850.

*To all whom it may concern:*

Be it known that I, WILLIAM MORRISON, of Carlisle, in the county of Cumberland and State of Pennsylvania, have invented certain new and useful Improvements in Plows, of which the following is a full, clear, and exact description, reference being had to the accompanying drawings, which form part of this specification, and in which—

Figure 1 represents a view in perspective of my plow, and Figs. 2, 3, and 4 are views of detached parts of the same.

My plow is of that class known as "gang-plows;" and my invention consists in a spring draft-bar, to which the team is hitched, and in the method of attaching the plow-irons to their respective beams.

My plow in this instance is constructed with three sets of irons, A A A, which are each secured to a separate beam, B B B, the beams being all united at their front extremities, and their hinder extremities, diverging from each other, are suitably braced, so as to form a triangular frame. Two handles, a, are secured to this frame, by which the plow is directed. The plow-clevis b, to which the team is hitched, is attached to the front extremity of a draft-bar, C. The latter is composed of two rigid pieces, c c', connected by a spring-plate. The front piece, c, is the longer of the two, and projects sufficiently in front of the frame to place the clevis or point of draft at a proper distance from the plowshare. The hinder extremity of this rigid bar c and the lower side of the hinder piece, c', are rounded, to allow them to rock as the spring-plate is flexed. The latter is secured to the rigid pieces by bolts or rivets and straps.

The compound draft-bar thus formed is attached to the frame in the following manner: Two standards, e' e', are erected on the central beam, and a slot is made in the hinder extremity of the front piece, c, and another through the middle of the hinder piece, c', through which the standards pass. The latter are perforated with a series of holes to receive pins i i, by changing the position of which the angle of draft may be varied in a vertical direction. The adjustment of the draft in a horizontal direction is effected by the clevis in the usual manner.

The spring draft-bar thus described renders the plow to a certain degree self-adjusting. Thus, when from the hard nature of the ground the front of the share would naturally rise, the spring, bending under the increased resistance, directs the point downward and forces it to run at its proper distance from the surface, while in soft ground, where the point of the share would naturally tend to descend, the tensive force of the spring-plate is continually opposed to this tendency, and thus prevents the shares from descending below certain limits. It also diminishes the liability to breakage by allowing the plow to yield when the shares come suddenly in contact with stones, and at the same time reduces the shock upon the shoulders of the animals by whom the plow is drawn.

The plow-irons (more fully represented in Figs. 2 and 3) are attached to their respective beams by two bolts. The bolt g is short, and is passed through a hole made in the upper part of the piece forming the mold-board and landside. The other or king bolt, h, is long, and performs three offices. First, it secures the share to the mold-board and landside; second, it forms the shin of the plow; and, third, it acts, in combination with the shorter bolt, g, to secure the whole to the beam. In order that it may perform these functions it is made sharp at its front, and with a flaring head, k, which is received in a countersunk hole in the share. As this bolt thus performs three distinct functions, it is obvious that plows constructed in this manner can be furnished at a lower cost, while at the same time the position of the nut of the bolt is such that it can be easily screwed up when necessary, and is not liable to loosening by coming in contact with obstructions.

What I claim as my invention, and desire to secure by Letters Patent, is—

The adjustable spring-bar, interposed between the point of draft and the frame of the plow, in the manner and for the purpose herein set forth.

WILLIAM MORRISON.

Witnesses:
W. M. PENROSE,
JOS. LEE, Sr.